United States Patent
Ganzi et al.

[11] Patent Number: 5,868,915
[45] Date of Patent: Feb. 9, 1999

[54] ELECTRODEIONIZATION APPARATUS AND METHOD

[75] Inventors: Gary C. Ganzi, Lexington, Mass.; Felice DiMascio, Nashua, N.H.; Anthony J. Giuffrida, North Andover; Frederick Wilkins, Pepperill, both of Mass.; Paul Springthorpe, Duston, United Kingdom

[73] Assignee: United States Filter Corporation, Palm Desert, Calif.

[21] Appl. No.: 717,781

[22] Filed: Sep. 23, 1996

[51] Int. Cl.$^6$ .................................................... B01D 61/44
[52] U.S. Cl. .......................... 204/524; 204/533; 204/536; 204/632
[58] Field of Search .................................. 204/524, 533, 204/536, 632

[56] References Cited

U.S. PATENT DOCUMENTS

| | | | |
|---|---|---|---|
| 2,514,415 | 7/1950 | Rasch | 136/26 |
| 2,794,777 | 6/1957 | Pearson | 204/151 |
| 2,815,320 | 12/1957 | Kollsman | 204/180 |
| 2,923,674 | 2/1960 | Kressman | 204/180 |
| 3,149,061 | 9/1964 | Parsi | 204/180 |
| 3,291,713 | 12/1966 | Parsi | 204/180 |
| 3,375,208 | 3/1968 | Duddy | 260/2.1 |
| 3,686,089 | 8/1972 | Korngold | 204/180 |
| 3,755,135 | 8/1973 | Johnson | 204/180 |
| 3,869,376 | 3/1975 | Teieda | 204/301 |
| 3,989,615 | 11/1976 | Kiga et al. | 204/252 |
| 4,032,452 | 6/1977 | Davis | 210/243 |
| 4,033,850 | 7/1977 | Kedem et al. | 204/301 |
| 4,089,758 | 5/1978 | McAloon | 204/98 |
| 4,130,473 | 12/1978 | Eddleman | 204/252 |

(List continued on next page.)

FOREIGN PATENT DOCUMENTS

| | | |
|---|---|---|
| 0 503 589 | 9/1992 | European Pat. Off. . |
| 0 680 932 | 11/1995 | European Pat. Off. . |
| 44 18 812 | 12/1995 | Germany . |
| 47-49424 | 12/1972 | Japan . |
| 776 469 | 6/1957 | United Kingdom . |
| 1137679 | 12/1968 | United Kingdom . |
| WO 9532791 | of 1991 | WIPO . |
| WO97/46492 | 12/1997 | WIPO . |

OTHER PUBLICATIONS

Johnson et al., Desalting by Means of Porous Carbon Electrodes, Mar. 1971, pp. 510–517, Electrochemical Technology, vol. 118, No. 3.

G.J. Gittens et al., Some Experimental Studies of Electrodeinisaton Through Resin Packed Beds, Mar. 1964, Harwell, Chemistry Div., U.K.A.E.A. Research Group, Atomic Energy Research Establishment.

Simons, Electric Field Effcts on Proton Transfer Between Ionizable Groups and Water in Ion Exchange Membranes, 1984, pp. 151–158, Electrochemical Technology.

Simons, Nature, vol. 280, Strong Electric Field Effects on Proton Transfer Between Membrane–Bound Amines and Water, Aug. 30, 1979, pp. 824–826.

(List continued on next page.)

Primary Examiner—Arun S. Phasge
Attorney, Agent, or Firm—Wolf, Greenfield & Sacks, P.C.

[57] ABSTRACT

An improved electrodeionization apparatus and method are provided. The electrodeionization apparatus includes electrolyte compartments, ion-concentrating, and ion-depleting compartments, having electroactive media therein. The electroactive media can be induced to have a reversible change in its chemical or electrical properties upon imposition of an external electrical field or the presence of an electrically charged substance. The change in chemical or electrical properties of the media results in a desired change in the transport or chemical properties of the media. The incorporation of the improved electroactive media also provides for an improved, and more reliable electrodeionization process in applications requiring chemical and temperature resistance media, where localized pH shifts would be harmful to the product being deionized, under temperature and chemical conditions of the liquid to be processed, or under circumstances where traditional media would tend to foul.

78 Claims, 3 Drawing Sheets

U.S. PATENT DOCUMENTS

| | | |
|---|---|---|
| 4,216,073 | 8/1980 | Goldstein .................................. 204/296 |
| 4,226,688 | 10/1980 | Kedem et al. ............................ 204/180 |
| 4,298,442 | 11/1981 | Giuffrida .................................. 204/180 |
| 4,430,226 | 2/1984 | Hedge et al. ............................. 210/638 |
| 4,465,573 | 8/1984 | O'Hare ..................................... 204/180 |
| 4,473,450 | 9/1984 | Nayak et al. ............................. 204/147 |
| 4,505,797 | 3/1985 | Hodgdon et al. ........................ 204/252 |
| 4,632,745 | 12/1986 | Giuffrida et al. ........................ 204/301 |
| 4,636,296 | 1/1987 | Kunz ..................................... 204/182.5 |
| 4,671,863 | 6/1987 | Tejeda ...................................... 204/266 |
| 4,687,561 | 8/1987 | Kunz ..................................... 204/182.5 |
| 4,707,240 | 11/1987 | Parsi et al. ............................ 204/290 F |
| 4,747,929 | 5/1988 | Siu et al. ................................. 204/301 |
| 4,747,955 | 5/1988 | Kunin ...................................... 210/679 |
| 4,753,681 | 6/1988 | Giuffrida et al. ..................... 134/22.17 |
| 4,804,451 | 2/1989 | Palmer ..................................... 204/301 |
| 4,925,541 | 5/1990 | Giuffrida et al. ..................... 204/182.5 |
| 4,931,160 | 6/1990 | Giuffrida ................................. 204/301 |
| 4,956,071 | 9/1990 | Giuffrida et al. ........................ 204/301 |
| 4,983,267 | 1/1991 | Moeglich et al. ..................... 204/182.4 |
| 5,026,465 | 6/1991 | Katz et al. ............................. 204/182.4 |
| 5,066,375 | 11/1991 | Parsi et al. ............................ 204/182.4 |
| 5,084,148 | 1/1992 | Kazcur et al. ............................ 204/95 |
| 5,092,970 | 3/1992 | Kaczur et al. ............................ 204/98 |
| 5,106,465 | 4/1992 | Kaczur et al. ............................ 204/98 |
| 5,116,509 | 5/1992 | White ........................................ 210/64 |
| 5,120,416 | 6/1992 | Parsi et al. ............................ 204/182.4 |
| 5,154,809 | 10/1992 | Oren et al. ............................ 204/182.4 |
| 5,196,115 | 3/1993 | Andelman ........................... 210/198.2 |
| 5,203,976 | 4/1993 | Parsi et al. ............................ 204/182.4 |
| 5,211,823 | 5/1993 | Giuffrida et al. ..................... 204/182.4 |
| 5,223,103 | 6/1993 | Kazcur et al. ............................ 204/95 |
| 5,240,579 | 8/1993 | Kedem ................................. 204/182.4 |
| 5,254,227 | 10/1993 | Cawlfield et al. ....................... 204/131 |
| 5,292,422 | 3/1994 | Liang et al. ............................. 204/301 |
| 5,308,466 | 5/1994 | Ganzi et al. ............................. 204/151 |
| 5,316,637 | 5/1994 | Ganzi et al. ......................... 204/182.4 |
| 5,346,624 | 9/1994 | Libutti et al. ........................... 210/679 |
| 5,356,849 | 10/1994 | Matviva et al. ......................... 502/180 |
| 5,376,253 | 12/1994 | Rychen et al. ........................... 204/301 |
| 5,434,020 | 7/1995 | Cooper .................................... 429/210 |
| 5,444,031 | 8/1995 | Hayden .................................... 502/180 |
| 5,451,309 | 9/1995 | Bell .......................................... 204/301 |
| 5,458,787 | 10/1995 | Bosin et al. ............................. 210/719 |
| 5,460,725 | 10/1995 | Stringfield .............................. 210/690 |
| 5,460,728 | 10/1995 | Klomp et al. ........................... 210/698 |
| 5,489,370 | 2/1996 | Lomasney et al. ...................... 204/627 |
| 5,503,729 | 4/1996 | Batchelder et al. ..................... 204/630 |
| 5,518,626 | 5/1996 | Birbara et al. .......................... 210/670 |
| 5,518,627 | 5/1996 | Tomoi et al. ............................ 210/682 |
| 5,538,611 | 7/1996 | Otowa ...................................... 204/550 |
| 5,538,655 | 7/1996 | Fauteux et al. ........................ 252/62.2 |
| 5,593,563 | 1/1997 | Denoncourt et al. .................... 204/524 |
| 5,679,228 | 10/1997 | Batchelder et al. ..................... 204/524 |
| 5,679,229 | 10/1997 | Goldstein et al. ....................... 204/524 |

OTHER PUBLICATIONS

Simons, Water Splitting in Ion Exchange Membranes, 1985, pp. 275–282, Pergamon Press Ltd.

Matějka, Continuous Production of High–Purity Water by Electro–deionisation, Apr. 1971, pp. 117–120, J. Appl. Chem. Biotechnol., vol. 21.

Walters et al., Concentration of Radioactive Aqueous Wastes, Jan. 1955, pp. 61–67, Industrial and Engineering Chemistry.

Warshawsky et al., Thermally Regenerable Polymerable Polymeric Crown Ethers, II Synthesis and Application in Electrodialysis, pp. 579–584.

Kedem et al., EDS–Sealed Cell Electrodialysis, 1983, pp. 291–299, Desalination 46.

Purolite Technical Bulletin, Hypersol–Macronet™ Sorbent Resins, 1995.

Simons, The Origin and Elimination of Water Splittin in Ion Exchange Membranes During Water Demineralisation by Electrodialysis, Jan. 29, 1979, pp. 41–42, Desalination, 28.

DiMascio et al., Electrodiaresis Polishing (an Electrochemical Deionization Process), pp. 164–172.

Dow Chemical Bulletin, DOWEX 11 Type Anion Resin.

Dow Chemical Bulletin, DOWEX Marathon C Cation Resin.

Korngold, Electrodialysis Processes Using Ion Exchange Resins Between Membranes, 1975, pp. 225–233, Desalination, 16.

Kedem et al., Reduction of Polarization by Ion–Conduction Spacers: Theoretical Evaluation of a Model System, 1978, pp. 143–156, Desalination, 27.

Farmer et al., Capacitive Deionization with Carbon Aeorgel Electrodes, Strategic Environmental Research and Development Program SERDP Project No. 436–94.

Hobro et al., Recycling of Chromium from Metal Finishing Waste Waters Using Electrochemical Ion Exchange (EIX), pp. 173–183, 1994.

Shapeshnik et al., Demineralization of Water by Electrodialysis with Ion–Exchanger Packing Between the Membranes, Jul. 12, 1971, pp. 2815–2818, Voronezh Technoligical Institute.

Sammon et al., An Experimental Study of Electrodeinisation and its Application to the Treatment of Radioactive Wastes, Jun. 1960, Chemistry Division, U.K.A.E.A. Research Group, Atomic Energy Research Establishment, Harwell.

Capacitive Deionization of $NH_4ClO_4$ solutions with carbon aerogel electrodes, Farmer, et al., J. Appl. Electrochemistry, 26 (1996), 1007–1018, (no month).

ELECTRODEIONIZATION APPARATUS AND METHOD

BACKGROUND OF THE INVENTION

1. Field of the Invention:

The present invention relates to an electrodeionization apparatus and method and, more particularly, to an electrodeionization apparatus and method incorporating specialized electroactive media to resist chemical attack, temperature degradation, and fouling, while improving electric current distribution and deionization performance.

2. Description of the Related Art:

Electrodeionization (EDI) is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices may comprise media of permanent or temporary charge, and may be operated batchwise, intermittently, or continuously. EDI devices may be operated to cause electrochemical reactions specifically designed to achieve or enhance performance, and may comprise electrically active membranes such as semipermeable ion exchange or bipolar membranes.

In continuous electrodeionization (CEDI), which includes processes such as continuous deionization, filled cell electrodialysis, or electrodiaresis (EDR), the ionic transport properties of the electrically active media are the primary sizing parameter. These processes are described, for example, by Kollsman in U.S. Pat. No. 2,815,320; Pearson in U.S. Pat. No. 2,794,777; Kressman in U.S. Pat. No. 2,923,674; Parsi U.S. Pat. Nos. 3,149,061 and 3,291,713; Korngold et al. in U.S. Pat. No. 3,686,089; Davis in U.S. Pat. No. 4,032,452; U.S. Pat. No. 3,869,376; O'Hare in U.S. Pat. No. 4,465,573; Kunz in U.S. Pat. Nos. 4,636,296 and 4,687,561; and Giuffrida et al. in U.S. Pat. No. 4,632,745.

A typical CEDI device comprises alternating electroactive semipermeable, anion and cation ion-exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction products from the electrodes can be separated from the other flow compartments. Upon imposition of the electric field, ions in the liquid are attracted to their respective counterelectrodes. The compartments bounded by the electroactive anion membrane facing the anode and the electroactive cation membrane facing the cathode become ionically depleted, and the compartments bounded by the electroactive anion membrane facing the cathode and the electroactive cation membrane facing the anode become ionically concentrated. The volume within the ion-depleting compartments, and preferentially within the ion-concentrating compartments, is also comprised of electrically active media. In continuous deionization devices, the media may comprise intimately mixed anion and cation exchange resins. The ion-exchange media enhances the transport of ions within the compartments and can also participate as a substrate for controlled electrochemical reactions. The configuration is similar in electrodiaresis devices, except that the media comprise separate, and sometimes alternating, layers of ion-exchange resin. In these devices, each layer is substantially comprised of resins of the same polarity (either anion or cation resin) and the liquid to be deionized flows sequentially through the layers.

A number of CEDI devices and processes have been successfully commercialized, for example, as disclosed by Giuffrida in U.S. Pat. No. 4,298,442; Giuffrida et al. in U.S. Pat. No. 4,632,745; Siu et al. in U.S. Pat. No. 4,747,929; Palmer in U.S. Pat. No. 4,804,451; Giuffrida et al. in U.S. Pat. No. 4,925,541; Giuffrida U.S. Pat. Nos. 4,931,160 and 4,956,071; White in U.S. Pat. No. 5,116,509; Oren et al. in U.S. Pat. No. 5,154,809; Giuffrida et al. in U.S. Pat. No. 5,211,823; and Ganzi et al. in U.S. Pat. Nos. 5,308,466 and 5,316,637. In addition, there have been a wide range of devices described in the literature, including Walters et al., "Concentration of Radioactive Aqueous Wastes," Ind. Eng. Chem., Vol. 47, 1, pp. 61–67 (1955); Sammon et al., "An Experimental Study of Electrodeionization and Its Application to the Treatment of Radioactive Wastes," AERE-R3137, Chemistry Division, U.K. AEA Research Group, Atomic Energy Research Establishment, Harwell (June 1960); Glueckauf, "Electrodeionization Through a Packed Bed," British Chemical Engineering, pp. 646–651 (Dec., 1959); Matějka, "Continuous Production of High Purity Water by Electrodeionization," J. Appl. Chem. Biotechnol., Vol. 21, pp. 117–120 (April, 1971); Shaposhnik et al., "Demineralization of Water by Electrodialysis with Ion-Exchanger Packing Between the Membranes," Zhurnal Prikladnoi Khimii, Vol. 46, 12, pp. 2659–2663 (December, 1973); Komgold, "Electrodialysis Processes Using Ion Exchange Resins Between Membranes," Desalination, Vol. 16, No. 2, pp. 225–233 (1975); and Kedem et al., "Reduction of Polarization by Ion-Conduction Spacers," Desalination, Vol. 27, pp. 143–156 (1978).

There remains a need for devices and processes with improved reliability and the ability to operate under more rigorous conditions with reduced power consumption and reduced membrane area. Often, the limiting factor in the applicability of CEDI is the ability of the electroactive media within the device to withstand the temperature, chemical, and fouling conditions of the liquid to be processed. One difficulty in specifying such electroactive media results from the need in most applications to incorporate both anion and cation media within the compartments and the membranes. Many times, conditions are relatively benign for media of a given fixed charge, but are limited by the oppositely charged media. For example, the presence of iron in the liquid to be processed may result in fouling of cation exchange resin and membrane, but would not affect the performance of anion exchange resin or membrane. Conversely, the presence of high temperature, chlorine or intermediate molecular weight weak organic compounds may result in degradation, oxidation, or fouling of anion exchange resin and membrane, but would not affect the performance of cation exchange resin or membrane.

In other cases, performance of CEDI is limited by difficulty in providing an effective cleaning regimen when a device is fouled or scaled with precipitate. Strategies for cleaning include methods for introducing cleaning chemicals into the device is disclosed, for example, by Giuffrida et al. in U.S. Pat. No. 4,753,681. This strategy is often limited by the chemical or temperature resistance of one of the electroactive components of the device. In other instances, there is no cleaning chemical that is effective in completely removing a foulant from the active media (a root cause is the common practice of incorporating media with a permanent ionic charge). Independently, or in combination with chemical cleaning, other defouling and descaling strategies include the practice of reversing polarity of the external power source as described, for example, by Giuffrida et al. in U.S. Pat. No. 4,956,071 and Katz et al. in U.S. Pat. No.

5,026,465. Although sometimes effective, this practice is also limited by the incorporation of low temperature resistance, chemical resistant media, or media of permanent fixed charge.

Performance of CEDI is may further be limited by difficulty in obtaining the desired electrical current distribution with the device. Electroactive media of permanent charge may change their electrical resistance properties in undesired ways depending on their ionic form. For example, in the ion substitution of sodium with hydrogen ion in EDR, most cation exchange resin will preferentially transport hydrogen ion over the desired transport of sodium ion. This results in electrical inefficiencies and, under certain circumstances, may cause pH shifts that are detrimental to valuable products within the liquid. In another example, a given electroactive media may be desirable for transport properties, such as the Type II anion membrane and resins for continuous deionization and EDR, but may have the undesirable properties of catalyzing the ionization reaction of water to hydrogen and hydroxide ions.

Furthermore, the presence of gases, poor flow distribution, low temperature and/or low conductance liquids within the electrolyte compartments may be detrimental to electrical current distribution, thereby reducing the efficiency of deionization. However, as a result of the oxidizing or reducing conditions common within the electrolyte compartments, standard electroactive media such as ion exchange resins or activated carbons (e.g. carbons prepared by pyrolyzing coal into small imperfect granulars having an interfacial area on the order of 10 $m^2$/g and contain up to 20% ash impurities) cannot be incorporated within the electrolyte compartments because of their limited chemical resistance.

In electrochemical ion exchange (EIX) and capacitive deionization (CapDI), both the transport and the capacity of the electroactive media are important sizing parameters. In EIX, the electrode reactions produce ions that are used for ionic substitution reactions within the electroactive media Typical EIX devices, as described, for example, by Hobro et al. in "Recycling of Chromium from Metal Finishing Waste Waters Using Electrochemical Ion Exchange," Electrochemical Society, Symposium on Water Purification, PV94–19, pp. 173–183 (1994), may or may not comprise ion exchange membranes. Similar to the CEDI processes, the performance of the EIX devices are often limited by use of permanently charged media, media of limited temperature and/or chemical resistance, and/or media with undesirable ion transport properties. In CapDI, high surface area, usually carbon type electrodes are used to adsorb ions as polarity is imposed, and then desorb ions as the electric field is removed or reversed. As with other processes, typical CapDI devices may also be limited by the use of electrodes of low chemical resistance, or limitations of the media to act equally well or in the desired manner when in use as both a cation and anion adsorber or as both an ion adsorber and desorber.

A need therefore remains for an improved electrodeionization apparatus which provides electroactive media that is resistant to chemical attack, temperature degradation, and fouling. In addition, a need remains for an electrodeionization apparatus having improved electric current distribution and deionization performance. The electroactive media should have the ability to change its charge and transport properties when in the presence of permanently charged media, varied chemical or electrochemically induced environments, and/or the presence, absence, or reversal of an externally imposed electrical field. Moreover, there is a need for an electrodeionization apparatus which promotes or limits electrochemical water splitting depending on its chemical environment. Lastly, there is a need to provide improved methods of operation of an electrodeionization apparatus.

SUMMARY OF THE INVENTION

Accordingly, the present invention is directed to an electrodeionization apparatus including electrolyte compartments, ion-concentrating, and ion-depleting compartments, wherein electroactive media positioned within at least one compartment comprises chemical, temperature, and fouling resistant synthetic carbonaceous adsorbents, which is a carbonaceous char having catalytic properties, less than 0.5% ash impurities, and a mean particle diameter between about 0.5 and 1.0 mm.

In another aspect of the present invention, an electrodeionization apparatus is provided including electrolyte compartments, ion-concentrating, and ion-depleting compartments, wherein electroactive media positioned within at least one compartment comprises chemical, temperature, and fouling resistant hypercrosslinked sorbent resins, which are polymeric adsorbent resin beads that are hypercrosslinked in a swollen state.

In another aspect of the present invention, an electrodeionization apparatus is provided including electrolyte compartments, ion-concentrating, and ion-depleting compartments, wherein electroactive media positioned within at least one compartment comprise chemical, temperature, and fouling resistant polymeric sorbent resin, which are polymeric adsorbent resin beads that are prepared by alkylene bridging haloalkylated, porogen-modified, cross-linked copolymer beads, having microporosities in the range of about 0.2 and 0.5 $cm^3$/g, mesoporosities of at least about 0.5 $cm^3$/g, and total porosity of at least about 1.5 $cm^3$/g.

In another aspect of the present invention, an electrodeionization apparatus is provided including electrolyte compartments, ion-concentrating, and ion-depleting compartments, wherein electroactive media positioned within at least one compartment are either intimately mixed with conventional ion exchange resins, or are placed in a layered bed with conventional ion exchange resins.

In another aspect of the present invention, an electrodeionization apparatus is provided including electrolyte compartments, ion-concentrating, and ion-depleting compartments, wherein the compartments are divided by semipermeable and permeable membranes, wherein synthetic carbonaceous adsorbents, hypercrosslinked sorbent resins, polymeric adsorbent resins, and the like are electroactive components of the membranes.

In another aspect of the invention, an electrodeionization apparatus can be operated under conditions of chemical solute, or temperature cycling, and/or electrical field polarity cycling or reversal.

In another aspect of the present invention, an electrodeionization apparatus is provided including electrolyte compartments, ion-concentrating, and ion-depleting compartments, wherein electroactive media positioned within at least one compartment comprises chemical, temperature, and fouling resistant synthetic weakly ionized ion exchange resins, and the like.

In another aspect of the present invention, an electrodeionization apparatus is provided including electrolyte compartments, ion-concentrating, and ion-depleting compartments, wherein electroactive media positioned within at least one compartment comprises chemical, temperature, and fouling resistant synthetic weakly ionized ion exchange resins, and the like that are either intimately mixed with conventional ion exchange resins, or are placed in a layered bed with conventional ion exchange resins.

In another aspect of the present invention, the weakly ionized resins, alone or in combination with strongly ionized ion exchange membrane components (having like or opposite charge), are electroactive components of semipermeable and permeable membranes that divide the electrolyte, ion-concentrating, and ion-depleting compartments in the electrodeionization apparatus. The electrodeionization apparatus is operated cyclically so that either or in combination: (1) the liquid in contact with the weakly ionized components is pH cycled, so that the weakly ionized resins cycle from the ionized form to the relatively non-fouling, non-ionized form; (2) the electric field strength and/or polarity is modified or reversed to generate localized water splitting reactions so that the weakly ionized resins cycle from the ionized form to the relatively non-fouling, non-ionized form; and/or (3) the liquid comprises a charged solute, typically multivalent or high molecular weight, that reacts with the weakly ionized resins to form a tightly bound complex that reverses the original fixed charge of the resin, creating an operational, chemically reversible semi-fixed charge resin, capable of transferring ions of opposite polarity that would not normally transfer based on the untreated original weakly ionized resin.

In another aspect of the present invention, an electrodeionization apparatus is provided including electrolyte compartments, ion-concentrating, and ion-depleting compartments, wherein electroactive media positioned within at least one compartment comprises temperature resistant, strongly ionized ion exchange resin as disclosed, for example, by Tomoi et al., in U.S. Pat. No. 5,518,627, or a linear polymer associated with a cyclic molecule comprising ion exchange functional groups to form a rotaxane as disclosed, for example, by Fauteux et al., in U.S. Pat. No. 5,538,655, or the like.

All combinations and permutations of the electroactive media and operational methods are available for practice in various liquid deionization applications as the need arises. For example, the electrodeionization apparatus and method of the present invention can be applied to processes that are presently not practically feasible due to lack of scaling and fouling resistance, temperature resistance, chemical resistance, or electrical efficiency. Typical applications would be the purification and softening of relatively untreated municipal water, relatively untreated well water and brackish water, and water containing foulants such as polyelectrolytes, tannins, lignins, fulvic acid, and other polar or weakly ionized or large ionized organic compounds, foulants such as iron, sulfide, phosphates, silicates, and other multivalent ions. Other applications would be in the treatment and processing of foods and beverages, sugars and various sugar fractionations and chemical modifications, starches, milk and milk by-products, by-products from cheese manufacture such as whey, purification and fractionation of proteins, products of various fermentation processes such as alcoholic beverages, pharmaceutical products and the like, processes in the chemical, pharmaceutical, food and beverage industries requiring ion substitutions in the presence of foulants and chemical oxidants, mixed solutes in low level radioactive waste streams, waste water streams containing heavy metals and organic compounds, and liquids in industries such as the food and beverage, chemical, pharmaceutical, power, and chemical industries where operation at elevated temperatures are required, or where sterilization or sanitization by heat or chemical oxidants is required.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

The present invention is directed to an electrodeionization apparatus and method including electroactive media that is resistant to chemical attack, temperature degradation, and fouling. The electrodeionization apparatus has improved electric current distribution and deionization performance, and can promote or limit electrochemical water splitting depending on its chemical environment. The electroactive media can change its charge and transport properties in the presence of permanently charged media, varied chemical or electrochemically induced environments, and/or the presence, absence, or reversal of an externally imposed electrical field. For the purposes of the present invention, an electrodeionization apparatus may be based on technologies such as continuous electrodeionization, electrodiaresis, filled-cell electrodialysis, electrochemical ion exchange, capacitive deionization, and the like. Moreover, an electrodeionization apparatus may be based on various configurations, such as a spiral design, as disclosed, for example, by Rychen et al., in U.S. Pat. No. 5,376,253, a plate and frame design, and a circular design comprising electrically inert disk-shaped spacers having a central hub and upper and lower surfaces, as disclosed, for example, by Liang et al., in U.S. Pat. No. 5,292,422.

Figure 1:
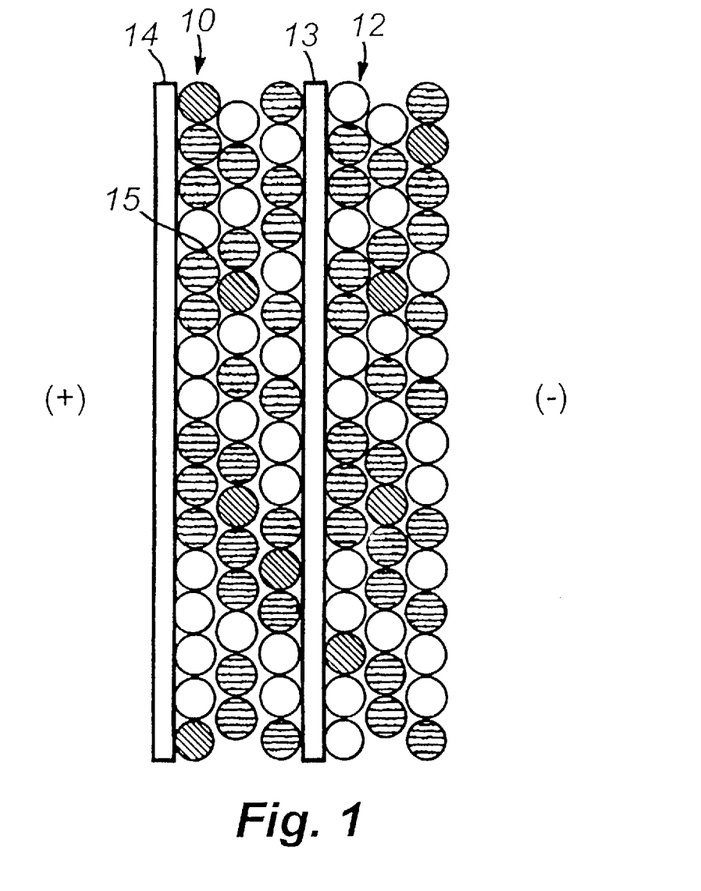
FIG. 1 is a schematic, sectional view through an electrodeionization apparatus incorporating specialized electroactive media in ion-depleting and ion-concentrating compartments of the apparatus according to the present invention.

As shown in a sectional view in FIG. 1, one embodiment of an electrodeionization apparatus of the present invention includes an ion-depleting compartment 10 and an ion-concentrating compartment 12. The compartments include ion-permeable membranes 13 and 14, and spacer (not shown) typically formed from a rigid material. The ion-permeable membranes 13 and 14 are typically sealed to the periphery of both sides of the compartments. A specialized electroactive media 15 is housed within a central space, typically including ribs (not shown), formed between ion-permeable membranes 13 and 14. In operation, a liquid to be purified is passed through at least one unit in the electrodeionization apparatus, comprising an ion-depleting compartment 10, and ion-concentrating compartment 12 and membranes 13 and 14. Typically, there are between 5 to 100 such units in an electrodeionization apparatus to provide adequate liquid flow-through capacity.

The specialized electroactive media 15 utilized in the ion-depleting compartment 10 and the ion-concentrating compartment 12 can include a quantity of anion resin materials having weak base groups in their surface regions, such as tertiary alkyl amino groups, or anion resin materials containing Type II functional groups in their surface regions, for example dimethyl ethanol amine. These materials are used in combination with resin materials containing Type I functional groups (quaternary ammonium groups) in their surface regions. As disclosed by Simons in "The Origin and Elimination of Water Splitting in Ion Exchange Membranes During Water Demineralization by Electrodialysis," *Desalination*, 28 (1979) 41–42, at current values above the limiting current, water will only dissociate at the interfaces between oppositely charged materials, where the anion material contains weak base groups in the surface regions, such as tertiary alkyl amino groups. These materials are commercially available, for example, as DOWEX™ WBA anion resins (trademark of Dow Chemical Company, Midland, Mich.). Additionally, anion materials containing Type II functional groups in the surface regions, for example dimethyl ethanol amine, can be used with or instead of materials having weak base groups. These materials are commercially available, for example, as AMBERJET™ 4600 Type II anion resins (trademark of Rohm & Haas Corporation, Philadelphia, Pa.), and DOWEX™ SAR Type II anion resins (trademark of Dow Chemical Company, Midland, Mich.).

Water dissociation will not occur with anion resin materials containing Type I functional groups (quaternary ammonium groups) in their surface regions unless the quaternary ammonium groups are oxidized to tertiary alkyl amine groups, as follows:

The tertiary alkyl amine then undergoes a protonation reaction,

R—CH$_2$N(CH$_3$)$_2$H$^+$ is then reacted, forming tertiary alkyl amine and hydrogen ion.

The overall reaction is the dissociation of water.

Therefore, in an electrodeionization device, anion resin containing quaternary ammonium groups, such as, but not limited to, DOWEX™ MARATHON™ A, DOWEX™ 11, or AMBERJET™ 4200 resins, are necessary because they can dissociate in solutions along the entire pH range and can split and exchange neutral salts. The specialized electroactive media of the present invention also include anion resin with dimethyl ethanol amine or tertiary alkyl amine groups to satisfy the catalytic requirements for water dissociation, making hydroxyl ions available to regenerate the anion resin. Excess water dissociation may provide the necessary hydroxyl ion concentration to enhance the removal of weakly ionized species, such as carbon dioxide and silica.

In one aspect of the present invention, therefore, anion resin materials containing Type I functional groups (quaternary ammonium groups) are modified so that they have the ability to dissociate in solutions along the entire pH range, split and exchange neutral salts, and dissociate water. Methods to modify the anion resin containing quaternary ammonium groups include, for example, (1) addition of a small amount of anion resin containing dimethyl ethanol amine or tertiary alkyl amine groups to the anion resin containing quaternary ammonium groups, (2) chemical oxidation of the anion resin containing quaternary ammonium groups by contacting the resin with a strong alkaline salt solution, or (3) thermal oxidation of the anion resin containing quaternary ammonium groups by contacting the resin with hot water or a salt solution.

Figure 2:
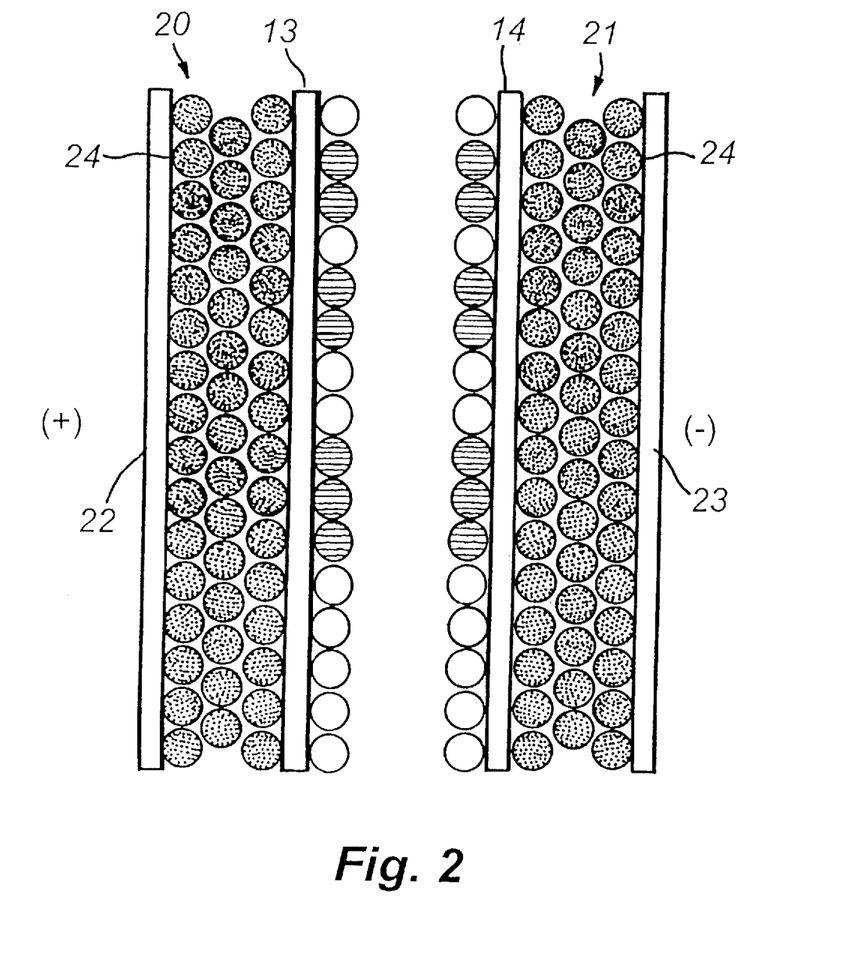
FIG. 2 is a schematic, sectional view through an electrodeionization apparatus incorporating specialized electroactive media in electrolyte compartments of the apparatus according to the present invention.

As shown in a sectional view in FIG. 2, another embodiment of an electrodeionization apparatus of the present invention, having an ion-depleting compartment and an ion-concentrating compartment (not shown), are typically bordered by an anolyte compartment 20 and a catholyte compartment 21. Typically, end blocks are positioned adjacent to end plates (not shown) to house an anode 22 and a cathode 23, and, as shown, a specialized electroactive media 24 can be housed adjacent the anode and the cathode. Ion-permeable membranes 13 and 14 are sealed to the periphery of both the anolyte 20 and the catholyte compartment 21. Liquid fed to the anolyte and the catholyte compartments can be either a dilute or a concentrated solution, flowing either upstream or downstream, in series, or parallel.

In continuous electrodeionization devices, electrodes are used as a means to transform the electron current supplied to the metallic electrodes into the required ionic current. Hydrogen ions are reduced to hydrogen gas at the cathode in the catholyte compartment, creating a basic environment, and hydroxyl ions, as well as chloride ions, are oxidized at the anode in the anolyte compartment, creating an acidic environment. These products are not used in the deionization process and serve no positive role in the process.

The ionic current is used for the deionization in the ion-depleting compartments. It is important that the resistances created by the electrolyte compartments are kept to a minimum in order to efficiently use the power applied to the module for deionization.

Generally, conventional electrolyte compartments use flow-through polyester screen to allow fluid flow through the cell, to support the membrane, and to promote turbulence. The inert polyester screen has poor conductive properties, however, and has about a 50% open area which inhibits the flow of DC current. It also does not provide the maximum possible support surface and membrane area exposed for contact. These factors can result in a high ohmic potential drop, and when the conductivity of the liquid fed to the compartment is dilute, such as with a reverse osmosis (RO) permeate, the ohmic potential drop becomes substantial.

In the embodiment of the present invention shown in FIG. 2, the specialized electroactive media 24 used in the anolyte 20 and the catholyte compartment 21 can include, but is not limited to ion exchange resins, such as DOWEX™ MARTHON™ series resins, DOWEX™ WBA anion resin, DOWEX™ 11 anion resin, DOWEX™ SAR anion resin, AMBERJET™ series resins, synthetic activated carbons, hypercrosslinked sorbent resins such as PUROLITE™ HYPERSOL-MACRONET™ sorbent resins (trademarks of the Purolite Company, Bala Cynwyd, Pa.), synthetic carbonaceous adsorbents such as AMBERSORB™ carbonaceous adsorbents (trademark of Rohm & Haas Corporation) and G-BAC™ adsorbents (trademark of Kureha Chemical Industry Co., Ltd., Japan), polymeric adsorbent resin beads that are prepared by alkylene bridging haloalkylated, porogen-modified, cross-linked copolymer beads, having microporosities in the range of about 0.2 and 0.5 cm$^3$/g, mesoporosities of at least about 0.5 cm$^3$/g, and total porosity of at least about 1.5 cm$^3$/g. as disclosed, for example, by Stringfield, in U.S. Pat. No. 5,460,725, and catalytic carbon as disclosed, for example, by Hayden, in U.S. Pat. No. 5,444,031, and Matviya et al., in U.S. Pat. No. 5,356,849. The preferred specialized electroactive media 24 used in the anolyte 20 and the catholyte compartment 21 are chemical, temperature, and fouling resistant synthetic carbonaceous adsorbents. This material is a carbonaceous char having catalytic properties, less than 0.5 % ash impurities, and a mean particle diameter between about 0.5 and 1.0 mm.

It is known that carbon and ion exchange resins have good conductive properties. When these materials are used as a static filler in anolyte or catholyte compartments, they form a supporting conductive bridge between the adjacent membrane and the electrode surface. Each of these materials conduct electricity differently. Carbon is conductive by the transfer of electrons, whereas ion exchange resins conduct by the transfer of ions.

When carbon is in contact with an electrode, the carbon becomes polarized to the same polarity as the electrode, essentially acting like an extension of the electrode. At the cathode, the carbon takes up electrons and pulls in an excess of cations. The reverse process occurs at the anode. The anode withdraws electrons from the carbon, which then repels electrons from the carbon, which then repels cations and attracts anions. The net effect is that as the cathode supplies electrons, sodium ions are drawn to the cathode, the anode receives electrons, and anions are drawn to the anode. This electrosorption process can pass current with the least amount of resistance, reducing the ohmic potential drop in the electrolyte compartments. Electrosorption has been investigated by Kedem et al., in U.S. Pat. Nos. 4,226,688 and 5,240,579; and Kedem et al., "Sealed Cell Electrodialysis," *Desalination*, 46 (1983) 291–299. Cooper, in U.S. Pat. No. 5,434,020; and Nayak, in U.S. Pat. No. 4,473,450 disclose the use of carbon material in conjunction with metallic electrodes.

When ion exchange resin material is used in the electrolyte compartments, they act as an immobile electrolyte. They provide a medium for ionic migration, as well as a medium for adsorption. Resins have a relatively high concentration of charged sites, typically on the order of 2 equivalence per liter. They increase the conductive network between the electrodes and increase the transfer of charge by enhancing the migration of ions. The use of ion exchange resin in the electrolyte compartments has been disclosed by Parsi, in U.S. Pat. Nos. 3,149,061 and 3,291,713; Kressman, in U.S. Pat. No. 2,923,674; Cawlfield et al., in U.S. Pat. No. 5,254,227; Kazcur et al., in U.S. Pat. Nos 5,223,103, 5,092,970, 5,106,465, and 5,084,148; Bell, in U.S. Pat. No. 5,451,309; and DiMascio et al., "Electrochemical Deionization," Electrochemical Society, Proceedings of the Symposium on Water Purification by Photocatalytic, Photochemical, and Electrochemical Processes, PV 94–19, pgs. 164–172 (1994).

Figure 3:
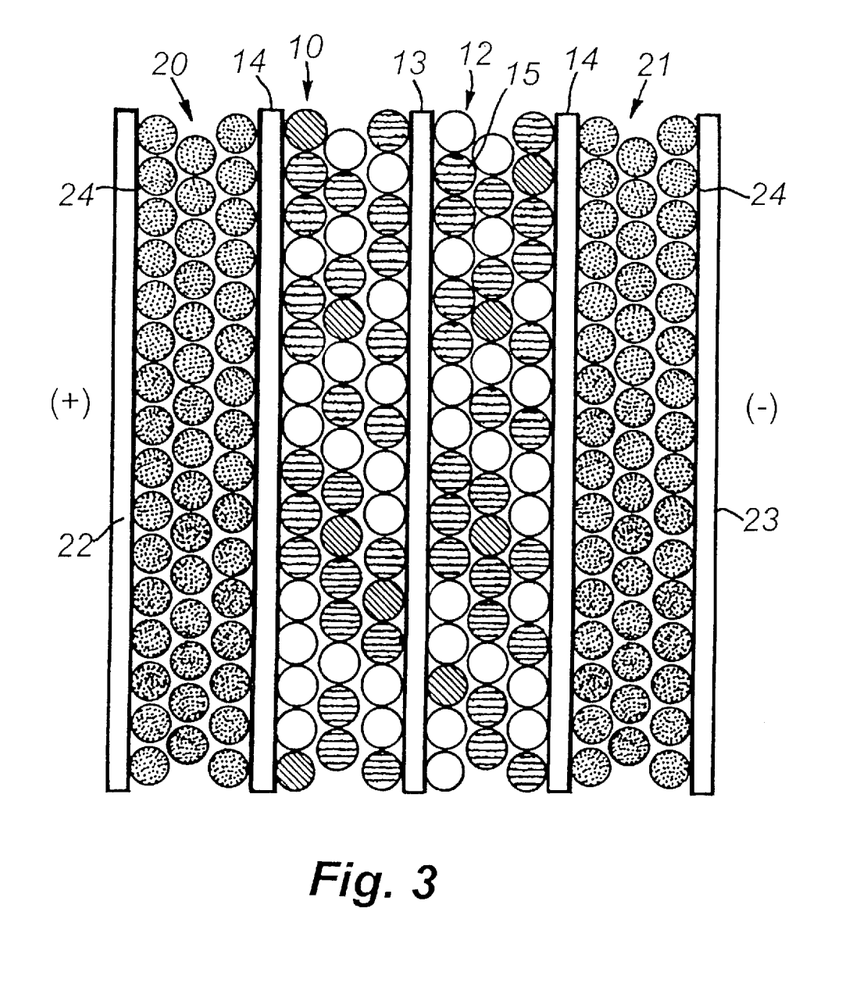
FIG. 3 is a schematic, sectional view through an electrodeionization apparatus incorporating specialized electroactive media in ion-depleting, ion-concentrating, and electrolyte compartments of the apparatus according to the present invention.

As shown in a sectional view in FIG. 3, another embodiment of an electrodeionization apparatus of the present invention includes ion-depleting compartment 10, ion-concentrating compartment 12 and ion-permeable membranes 13 and 14. A first specialized electroactive media 15 is housed between the ion-permeable membranes. In addition, the anolyte compartment 20 and the catholyte compartment 21, respectively housing anode 22 and cathode 23, include another specialized electroactive media 24 adjacent the anode and the cathode.

The electroactive media can also be used as a dynamic filler, wherein these materials are continuously slurried through the electrolyte compartments during operation. This is referred to as a suspension electrode. The use of carbon suspension electrodes to avoid pH changes by the electrolyte compartments during a transport and polarization study is disclosed by Warshawsky et al., in "Thermally Regenerable Polymerable Polymeric Crown Ethers," *J. Polymer Science*, pgs. 579–584.

The use of these materials in the ion-concentrating compartments have the same effect as in the electrolyte compartments. They can be used either as a static or dynamic filler, forming a supporting conductive bridge between adjacent membranes.

These materials reduce the ohmic potential drop in the concentrate compartments by reducing the resistance of the medium through which current must travel, enhancing the flow of electrical current. They provide the maximum possible support surface for the membrane, and provide the maximum possible membrane area exposed for contact, allowing the current to flow more uniformly through the module.

In another aspect of the invention, an electrodeionization apparatus can be operated under conditions of chemical solute, or temperature cycling, and/or electrical field polarity cycling or reversal. The performance of electrodeionization is limited by difficulty in cleaning a device that is fouled or scaled with precipitate. Electrodeionization cleaning procedures include, for example, chemical cleaning with or without electrical field polarity cycling or reversal, temperature cycling, and or chemical solute (or pH) cycling.

With electroactive media that contains weakly ionized components, the chemical nature of the media is controlled by the acid or base strength of the functional groups. Weak acid groups, such as —$COO^-$ are ionized only at high pH. At low pH, they combine with $H^+$, forming undissociated —COOH, and thus no longer act as a functional group. Similarly, weak base groups, such as —$NH_3^+$, lose a proton, forming uncharged —$NH_2$, when the pH is high.

Therefore, if the contacting liquid is pH cycled, one or all of the components of the electroactive media can be cycled from the ionized to non-ionized form, providing a method of defouling.

If the electric field strength and/or polarity is modified or reversed to generate localized water splitting reactions, one or all of the components of the electroactive media can be cycled from the ionized to non-ionized form, providing a method of defouling.

Temperature cycling can also be used in combination with electrical field polarity cycling or reversal, and/or chemical solute (or pH) cycling or independently a means for sanitation. Such temperature cycling includes ramping the temperature from ambient to 85° C. in about 15 minutes, maintaining this temperature for about 60 minutes, and cooling the temperature from 85° C. to ambient in about 15 minutes.

The present invention will be further illustrated by the following examples, which are intended to be illustrative in nature and are not to be considered as limiting the scope of the invention.

EXAMPLES

The following examples used compact continuous deionization modules. A reverse osmosis permeate stream at a conductivity of between about 1.0 $\mu$S/cm and about 3.0 $\mu$S/cm, at a temperature of 15° to 18° C., was used as the feed in each example (except as noted). The modules were operated at a nominal flow rate of about 200 mls/cell-pair at a product recovery of about 67 percent. The applied DC voltage to the modules was between 3 and 4 volts per cell pair.

Throughout the examples, the in-line conductivity measurements were made with a 832 digital resistivity indicator (available from Thorton, Waltham, Mass.), the water temperature was measured with a GT-300 in-line thermometer (available from Tel-Tru Manufacturing Co., Rochester, N.Y.), and the water flow rates were measured with a 0.4 to 4.0 lpm flow meter (available from Blue White, Westminster, Calif.). Power was supplied to the modules with a constant voltage/amperage power supply (available from BK Precision, Chicago, Ill.). The $CO_2$ conconcentration was determined by volumetric titration with sodium hydroxide to a phenolphthalein endpoint of pH 8.3.

EXAMPLE I

The effectiveness of the electrodeionization apparatus of the present invention was evaluated with respect to a conventional electrodeionization apparatus utilizing standard strong acid cation and strong base anion exchange resins in the ion-depleting and the ion-concentrating compartments. The electrodeionization apparatus of the present invention utilized a specialized electroactive media, in which a percentage of the strong base anion exchange resin was replaced with weak base or Type II anion resin, in the ion-depleting and ion-concentrating compartments, as shown in FIG. 1. The units were evaluated with regard to $CO_2$ removal and electrical resistance.

Two electrodeionization modules were assembled by pouring a measured volume of either a conventional ion exchange resin mixture or a mixture of specialized electroactive media and conventional ion exchange resin into each module spacer to completely fill the cell volume, and placing and sealing a membrane on top of the spacer. A Control Module was prepared by filling the ion-depleting and ion-concentrating compartments with a conventional ion exchange resin mixture, having a 70/30 ratio, of DOWEX™ MARATHON™ A anion resins and DOWEX™ MARATHON™ C cation resins (trademarks of Dow Chemical Company, Midland, Mich.). The second module, Module A, was prepared by filling the ion-depleting and ion-concentrating compartments with a mixture of specialized electroactive media and conventional ion exchange resin, having a 63/7/30 ratio of DOWEX™ MARATHON™ A anion resins, AMBERJET™ 4600 Type II anion resins, and DOWEX™ MARATHON™ C cation resins.

The $CO_2$ concentration in the feed water was increased to 20 ppm, and the performance of the modules was evaluated with regard to $CO_2$ removal and electrical resistance, as reported in Table 1 below.

TABLE 1

| Module | Control | Module A |
|---|---|---|
| Product Resistivity (MΩ-cm) | >18 | >18 |
| Electrical Resistance (Ω) | 23.6 | 20.4 |

As reported in Table 1, at the 20 ppm $CO_2$ feed level, the product resistivity on both modules was greater than 18 MΩ-cm, indicating that the majority of the $CO_2$ was removed, and the electrical resistance of Module A was about 14% lower than the Control Module.

The $CO_2$ concentration in the feed water was then increased to 40 ppm, and the performance of the modules was evaluated with regard to $CO_2$ removal and electrical resistance, as reported in Table 2 below.

TABLE 2

| Module | Control | Module A |
|---|---|---|
| Product Resistivity (MΩ-cm) | 3.4 | 9.0 |
| Electrical Resistance (Ω) | 24.1 | 16.2 |

As reported in Table 2, at the 40 ppm $CO_2$ feed level, the product resistivity of Module A was greater than the Control Module, and greater than 97% of the $CO_2$ was removed. The Module A electrical resistance was about 30% lower than the Control Module.

Therefore, the addition of the Type II anion resin to the strong base anion resin in Module A induced water dissociation, and provided the necessary hydroxyl ion concentration to enhance the $CO_2$ removal at high $CO_2$ levels, while lowering the electrical resistance.

EXAMPLE II

The effectiveness of the electrodeionization apparatus of the present invention was evaluated with respect to a conventional electrodeionizatiori apparatus utilizing standard polyester screen in the electrolyte compartments. The electrodeionization apparatus of the present invention were evaluated with specialized electroactive media in the electrolyte compartments, as shown in FIG. 2. The units were evaluated with regard to electrical resistance.

Three electrodeionization modules were assembled by placing a module end frame (containing a recessed electrode) onto an end plate, and pouring a measured volume of either synthetic carbon adsorbent or a mixture of ion exchange resin into the recessed area (on top of the electrode), and placing and sealing a membrane on top of the material. A Control Module was prepared by using a conventional polyester screen in the electrolyte compartments. The second module, Module A, was prepared by using 100% G-BAC™ synthetic carbon adsorbent in the electrolyte compartments. The third module, Module B, was prepared with a mixture of ion exchange resin, having a 70/30 ratio of DOWEX™ MARATHON™ A anion resins and DOWEX™ MARATHON™ C cation resins in the electrolyte compartments.

The performance of the modules was evaluated with regard to the electrical resistance, as reported in Table 3 below.

TABLE 3

| Module | Control | Module A | Module B |
|---|---|---|---|
| Product Resistivity (MΩ-cm) | >18 | >18 | >16 |
| Electrical Resistance (Ω) | 144 | 13 | 12 |

As reported in Table 3, the module's electrical resistance was decreased by 12× when using the synthetic carbon adsorbent in the electrolyte compartments, with no change in the product resistivity. The module's electrical resistance was decreased 11× when using the ion exchange resin in the electrolyte compartments. The product resistivity was greater than 18 MΩ-cm and progressively decreased after 300 hours of operation. The average product resistivity over the entire evaluation was greater than 16 MΩ-cm. The module started leaking after 300 hours as a result of natural resin swelling from its exhausted to regenerated forms. The leaking may have affected the fluid distribution in the electrolyte compartments, and throughout the module, resulting in a decrease in product resistivity.

The synthetic carbon adsorbent beads reduced the electrical resistance by as much as 14x. It has been determined that if the resistance of the electrolyte compartments were eliminated, the module's electrical resistance would reduce about 7x. This indicates that not only was the electrical resistance of the electrolyte compartments reduced, but the current distribution throughout the module was improved, increasing the effective area of the module.

EXAMPLE III

The effectiveness of the electrodeionization apparatus of the present invention was evaluated with respect to a conventional electrodeionization apparatus utilizing standard strong acid cation and strong base anion exchange resins in the ion-depleting and the ion-concentrating compartments, and a standard polyester screen in the electrolyte compartments. The electrodeionization apparatus of the present invention utilized a specialized electroactive media, in which a percentage of the strong base anion exchange resin was replaced with weak base or Type II anion resin, in the ion-depleting and ion-concentrating compartments, and a specialized electroactive media was used in the electrolyte compartments, as shown in FIG. 3. The units were evaluated with regard to $CO_2$ removal at low temperatures.

Two electrodeionization modules were assembled. A Control Module was prepared by filling the ion-depleting and ion-concentrating compartments with a conventional ion exchange resin mixture, having a 70/30 ratio, of DOWEX™ MARATHON™ A anion resins and DOWEX™ MARATHON™ C cation resins, and by using a conventional polyester screen in the electrolyte compartments. The second module, Module A, was prepared by filling the ion-depleting and ion-concentrating compartments with a mixture of specialized electroactive media and conventional ion exchange resin, having a 63/7/30 ratio of DOWEX™ MARATHON™ A anion resins, AMBERJET™ 4600 Type II anion resins, and DOWEX™ MARATHON™ C cation resins, and by using 100% G-BAC™ synthetic carbon adsorbent in the electrolyte compartments.

The $CO_2$ concentration in the feed water was increased to 20 ppm, and the temperature of the feed water was decreased to about 7° C. The performance of the modules was evaluated with regard to $CO_2$ removal and electrical resistance, as reported in Table 4 below.

TABLE 4

| Module | Control | Module A |
|---|---|---|
| Product Resistivity (MΩ-cm) | 0.36 | 14.6 |
| Electrical Resistance (Ω) | 225 | 24 |

The data indicates that the module using the synthetic carbon adsorbent filled electrolyte compartments, and the 7% Type II anion resin mixture in the ion-depleting and the ion-concentrating compartments, was capable of removing $CO_2$ from low temperature water. The module's electrical resistance was decreased by about 9x, with a significant increase in product resistivity.

The synthetic carbon adsorbent appears to the best media material for an electrolyte compartment. Ion exchange resin is less desirable because of the swelling and low tolerance to oxidizing chemicals and temperature. Carbon in bead form provides the maximum possible support surface for the adjacent membrane and provides the maximum possible area exposed for contact, allowing the current to flow more uniformly.

Although particular embodiments of the invention have been described in detail for purposes of illustration, various changes and modifications may be made without departing from the scope and spirit of the invention. Accordingly, the invention is not to be limited except as by the appended claims.

What is claimed is:

1. An electrodeionization apparatus, comprising:
   an ion-concentrating compartment,
   an ion-depleting compartment,
   anode and a cathode,
   an anolyte compartment and a catholyte compartment, and
   an electroactive media positioned within at least one of the ion-concentrating and ion-depleting compartments, the electroactive media comprising anion resin material with Type I functional groups in combination with anion resin material selected from the group consisting of anion resin material with weak base goups, anion resin material with Type II functional groups, and mixtures thereof.

2. The electrodeionization apparatus of claim 1, wherein the electroactive media is mixed or layered with anion exchange resin beads and cation exchange resin beads.

3. The electrodeionization apparatus of claim 1, wherein the compartments are divided by semipermeable or permeable membranes, and the electroactive media is an electroactive component of the membranes.

4. An electrodeionization apparatus comprising:
   an ion-concentrating compartment,
   an ion-depleting compartment,
   an anolyte compartment and a catholyte compartment, and
   an electroactive media positioned within at least one of the anolyte compartment and the catholyte compartments, wherein the electroactive media is selected from the group consisting of synthetic activated carbon, hypercrosslinked sorbent resin, synthetic carbonaceous adsorbent, polymeric adsorbent resin, and catalytic carbon.

5. The electodeionization apparatus of claim 4, wherein the electroactive media is positioned within both the anolyte compartment and the catholyte compartments.

6. The electrodeionization apparatus of claim 5, wherein the electroactive media is postioned within both the ion-concentrating and the ion-depleting compartments.

7. The electrodeionization apparatus of claim 4, wherein the electroactive media is mixed or layered with anion exchange resin beads and cation exchange resin beads.

8. The electodeionization apparatus of claim 5, wherein the electoactive media is mixed or layered with anion exchange resin beads and cation exchange resin beads.

9. The electrodeionization apparatus of claim 6, wherein the electoactive media is mixed or layered with anion exchange resin beads and cation exchange resin beads.

10. The electodeionization apparatus of claim 4, wherein the electroactive media comprises a synthetic carbonaceous adsorbent.

11. The electrodeionzation apparatus of claim 5, wherein the electroactive media comprises a synthetic carbonaceous adsorbent.

12. The electrodeionization apparatus of claim 6, wherein the electroactive media comprises a synthetic carbonaceous adsorbent.

13. The electrodeionization apparatus of claim 10, wherein the synthetic carbonaceous adsorbent is a carbonaceous char having catalytic properties.

14. The electrodeionization apparatus of claim 11, wherein the synthetic carbonaceous adsorbent is a carbonaceous char having catalytic properties.

15. The electrodeionization apparatus of claim 12, wherein the synthetic carbonaceous adsorbent is a carbonaceous char having catalytic properties.

16. The electrodeionization apparatus of claim 4, wherein the electroactive media is a hypercrosslinked sorbent resin formed from polymeric adsorbent resin beads hypercrosslinked in a swollen state.

17. The electrodeionization apparatus of claim 5, wherein the electroactive media is a hypercrosslinked sorbent resin formed from polymeric adsorbent resin beads hypercrosslinked in a swollen state.

18. The electrodeionization apparatus of claim 6, wherein the electroactive media is a hypercrosslinked sorbent resin formed from polymeric adsorbent resin beads hypercrosslinked in a swollen state.

19. The electodeionization apparatus of claim 4, wherein the electroactive media comprises polymeric adsorbent resin beads prepared by the alkylene bridging of haloalkylated, porogen-modified, cross-linked copolymer beads.

20. The electrodeionization apparatus of claim 5, wherein the electroactive media comprises polymeric adsorbent resin beads prepared by the alkylene bridging of haloalkylated, porogen-modified, cross-linked copolymer beads.

21. The electrodeionization apparatus of claim 6, wherein the electroactive media comprises polymeric adsorbent resin beads prepared by the alkylene bridging of haloalkylated, porogen-modified, cross-linked copolymer.

22. The electrodeionization apparatus of claim 4, wherein the compartments are divided by semipermeable or permeable membranes, and the electroactive media is an electoactive component of the membranes.

23. The electrodeionization apparatus of claim 5, wherein the compartments are divided by semipermeable or permeable membranes, and the electroactive media is an electroactive component of the membranes.

24. The electrodeionization apparatus of claim 6, wherein the compartments are divided by semipermeable or permeable membranes, and the electroactive media is an electoactive component of the membranes.

25. An electrodeionization apparatus, comprising:
   an ion-depleting and an ion-concentrating compartment;
   a first electroactive media positioned within at least one of the ion-concentrating and the ion-depleting compartments, the ion exchange resin material including anion resin material with Type I functional groups in combination with anion resin material selected from the group consisting of anion resin material with weak base groups, anion resin material with Type II functional groups, and mixtures thereof;
   an anolyte compartment and a catholyte compartment; and
   a second electroactive media positioned within at least one of the anolyte and catholyte compartments, the second electroactive media comprising chemical, temperature, and fouling resistant synthetic carbonaceous adsorbent.

26. The electrodeionization on apparatus of claim 25, wherein the compartments are divided by semipermeable or permeable membranes, and the first electroactive media is an electroactive component of the membranes.

27. The electrodeionization apparatus of claim 25, wherein the compartments are divided by semipermeable or permeable membranes, wherein an electroactive component of the membranes is selected from the group consisting of ion exchange resin material, synthetic activated carbon, hypercrosslinked sorbent resin, synthetic carbonaceous adsorbent, polymeric adsorbent resin, and catalytic carbon.

28. An electrodeionization aparatus, comprising:
   an ion-depleting compartment,
   an anode and a cathode, and
   a specialized electroactive media positioned within the ion-depleting compartment, the specialized electroactive media comprising chemical, temperature and fouling resistant ion exchange resin material.

29. The electrodeionization apparatus of claim 28, wherein the specialized electroactive media comprises anion resin material with Type I functional groups in combination with anion resin material selected from the group consisting of anion resin material with weak base groups, anion resin material with Type II functional groups, and mixtures thereof.

30. An electrodeionization apparatus of claim 28, wherein the specialized electroactive media further comprises a synthetic carbonaceous adsorbent.

31. The electrodeionization apparatus of claim 28, wherein the specialized electroactive media is a hypercrosslinked sorbent resin formed from polymeric adsorbent resin beads hypercrosslinked in a swollen state.

32. The electrodeionization apparatus of claim 28, wherein the specialized electroactive media comprises polymeric adsorbent resin beads prepared by the alkylene bridging of haloalkylated, porogen-modified, cross-linked copolymer beads.

33. The electrodeionization apparatus of claim 28, wherein the special electroactive media compnses a rotoxane.

34. The electrodeionization apparatus of claim 28, wherein the specialized electroactive media comprises a catalytic electoactive material.

35. The electrodeionization apparatus of any claims 28 through 34, wherein the compartments are divided by semipermeable or permeable membranes, and the specialized electoactive media is an electroactive component of the membranes.

36. The electrodeionization apparatus any of claims 28 through 34, wherein the specialized electroactive media is mixed or layered with anion exchange resin material and cation exchange resin material.

37. The electrodeionization apparatus of claim 28, wherein the apparatus comprises a configuration selected from the group consisting of a plate and frame configuration, a spiral configuration, and a circular configuration including electrically inert disk-shaped spacers having a central hub and upper and lower surfaces.

38. The electrodeionization apparatus of claim 30, wherein the synthetic carbonaceous adsorbent is a carbonaceous char having catalytic properties.

39. An electrodeionization apparatus, comprsing:
   an ion-concentrating compartment,
   an ion-depleting compartment,
   an anolyte comparment and a catholyte compartment, and
   a specialized electroactive media positioned within at least one of the ion-concentrating and ion-depleting compartments, and within at least one of the anolyte and catholyte compartments, the specialized electroactive media comprising chemical, temperature and fouling resistant ion exchange resin material.

40. The electrodeionization apparatus of claim 39, wherein the specialized electroactive media comprises a synthetic carbonaceous adsorbent.

41. The electrodeionization apparatus of claim 39, wherein the specialized electroactive media is a hyperosslinked sorbent resin formed from polymeric adsorbent resin beads hypercrosslinked in a swollen state.

42. The electrodeionization apparatus of claim 39, wherein the specialized electroactive media comprises polymeric adsorbent resin beads prepared by the alkylene bridging of haloalkylated, porogen-modified, cross-linked copolymer beads.

43. The electrodeionization apparatus of claim 39, wherein the specialized electroactive media comprises a rotoxane.

44. The electrodeionization apparatus of claim 39, wherein the specialized electroactive media comprises a catalytic electroactive material.

45. The electrodeionization apparatus of any claims 39 through 44, wherein the compartments are divided by semi-permeable or permeable membranes, and the specialized electroactive media is an electroactive component of the membranes.

46. The electrodeionization apparatus any of claims 39 through 44, wherein the speclalized eletroactive media is mixed or layered with anion exchange resin material and cation exchange resin material.

47. The electrodeionization apparatus of claim 39, wherein tbe apparatus comprises a configuration selected from the group consisting of a plate and frame configuration, a spiral configuration, and a circular configuration including electrically inert disk-shaped spacers having a cental hub and upper and lower surfaces.

48. The electrodeionization apparatus of claim 40, wherein the syntetic carbonaceous adsorbent is a carbonaceous char having catalytic properties.

49. An electrodeionization apparatus, comprising:
an ion-concentrating compartment,
an ion-depleting compartment,
an anolyte compartment and a catholyte compartment, and
a specialized electroactive media positioned within at least one of the ion-concentrating and ion-depleting compartments, and within the anolyte and the catholyte compartment, the specialized electroactive media comprising chemical, temperature and fouling resistant ion exchange resin material.

50. The electrodeionization apparatus of claim 49, wherein the specialized electroactive media comprises a synthetic carbonaceous adsorbent.

51. The electrodeionization apparatus of claim 49, wherein the specialized electroactive media is a hyper-crosslinked sorbent resin formed from polymeric adsorbent resin beads hypercrosslinked in a swollen state.

52. The electrodeionization apparatus of claim 49, wherein the specialized electroactive media comprises polymeric adsorbent resin beads prepared by the alkylene bridging of haloalkylated, porogen-modified, cross-linked copolymer beads.

53. The electrodeionization apparatus of claim 49, wherein the specialized electroactive media comprises a rotoxane.

54. The electrodeionization appatus of claim 49, wherein the specialized electroactive media comprises a catalytic eletroactive material.

55. The electrodeionization apparatus of any claims 49 through 54, wherein the compartments are divided by semi-permeable or permeable membranes, and the specialized electroactive media is an electroactive component of the membranes.

56. The electrodeionization apparatus any of claims 49 through 54, wherein the specialized electroactive media is mixed or layered with anion exchange resin mateial and cation exchange resin material.

57. The electrodeionization apparatus of claim 49, wherein the apparatus comprises a configuration selected from the group consisting of a plate and frame configuration, a spiral configuration, and a circular configuration including electrically inert disk-shaped spacers having a central hub and upper and lower surfaces.

58. The electrodeionization apparatus of claim 50, wherein the synthetic carbonaceous adsorbent is a carbonaceous char having catalytic properties.

59. An electrodeionization apparatus, comprising:
an ion-concentrating compartment,
an ion-depleting compartment,
an anolyte compartment and a catholyte compartment, and
a specialized electroactive media positioned within an ion-concentrating, an ion-depleting compartment, the anolyte compartment, and the catholyte compartment, the specialized electroactive media comprising chemical, temperature and fouling resistant ion exchange resin material.

60. An electrodeionization apparatus of claim 59, wherein the specialized electroactive media further comprises a synthetic carbonaceous adsorbent.

61. The electrodeionization apparatus of claim 59, wherein the specialized electroactive media is a hyper-crosslinked sorbent resin formed from polymeric adsorbent resin beads hypercrosslinked in a swollen state.

62. The electrodeionization apparatus of claim 59, wherein the specialized electoactve media comprises polymeric adsorbent resin beads prepared by the alkylene bridging of haloalkylated, porogen-modified, cross-linked copolymer beads.

63. The electrodeionization apparatus of claim 59, wherein the specialized electroactive media comprises a rotoxane.

64. The electrodeionization apparatus of claim 59, wherein the specialized electroactive media comprises a catalytic electroactive material.

65. The electrodeionization apparatus of any claims 59 through 64, wherein the compartments are divided by semi-permeable or permeable membranes, and the specialized electroactive media is an electroactive component of the membranes.

66. The electrodeionization apparatus any of claims 59 frough 64, wherein the specialized eletroactive media is mixed or layered with anion exchange resin material and cation exchange resin material.

67. The electrodeionization apparatus of claim 59, wherein the apparatus comprises a configuration selected from the group consisting of a plate and frame configuration, a spiral configuration, and a circular configuration including electrically inert disk-shaped spacers having a central hub and upper and lower surfaces.

68. The electrodeionization apparatus of claim 59, wherein the synthetic carbonaceous adsorbent is a carbonaceous char having catalytic properties.

69. A method of purifying a liquid in an electrodeionization apparatus, comprising:

providing an electrodeionization apparatus, including an ion-concentrating compartment, an ion-depleting compartment, an anode and a cathode;

position a first electroactive media within at least one of the ion-concentrating and ion-depleting compartments to promote dissociation of water molecules along the entire pH range, the first electroactive media comprising anion resin material with Type I functional groups in combination with anion resin material selected from the group consisting of anion resin material with weak base groups, anion resin material with Type II functional groups, and mixtures thereof;

applying an electrical current across the electrodeionzation apparatus; and passing the liquid through the compartments.

70. The method of claim 69, further comprising:

providing an anolyte compartment and a catholyte compartment; and positioning a second electroactive media selected from the group consisting of ion exchange resin material, synthetic activated carbon, hypercrosslinked sorbent resin, synthetic carbonaceous adsorbent, polymeric adsorbent resin, rotoxanes, and catalytic carbon, within at least one of the anolyte and catholyte compartments.

71. The method of claim 69, further comprising:

cyclically operating the electrodeionization apparatus under conditions selected from the group consisting of chemical solute cycling, electrical field cycling, temperature cycling, and combinations thereof, such that weakly ionized components of the electroactive media cycle from an ionized form to a non-ionized form, and wherein the liquid comprises a charged or high molecular weight solute such that a fixed resin charge is reversed.

72. The method of claim 70, further comprising:

cyclically operating the electrodeionization apparatus under conditions selected from the group consisting of chemical solute cycling, electrical field cycling, temperature cycling, and combinations thereof, such that weakly ionized components of said electroactive media cycle from an ionized form to a non-ionized form, and wherein the liquid comprises a charged or high molecular weight solute such that a fixed resin charge is reversed.

73. The method of claim 69, further comprising:

cyclically operating the electrodeionization apparatus under conditions selected from the group consisting of chemical solute cycling, electrical field cycling, temperature cycling, and combinations thereof, such that weakly ionized components of the electroactive media cycle from an ionized form to a non-ionized form, and wherein the liquid comprises a charged or high molecular weight solute such that a charge is generated on the specialized electroactive media.

74. The method of claim 70, further comprising:

cyclically operating the electrodeionization apparatus under conditions selected from the group consisting of chemical solute cycling, electrical field cycling, temperature cycling, and combinations thereof, such that weakly ionized components of said electroactive media cycle from an ionized form to a non-ionized form, and wherein the liquid comprises a charged or high molecular weight solute such that a charge is generated on the specialized electroactive media.

75. The electrodeionization apparatus of claim 4, wherein the electroactive media further comprises ion exchange resin.

76. The electrodeionization apparatus of claim 4, wherein the electroactive media is positioned in at least one of the ion-depleting compartments.

77. The electrodeionization apparatus of claim 4, wherein the electroactive media is positioned in at least one of the ion-concentrating compartments.

78. An electrodeionization apparatus, comprising:

an ion-depleting compartment, an anode and a cathode, and a specialized electroactive media positioned within the ion-depleting compartment, the specialized electroactive media comprising temperature resistant ion exchange resin material.

* * * * *